UNITED STATES PATENT OFFICE.

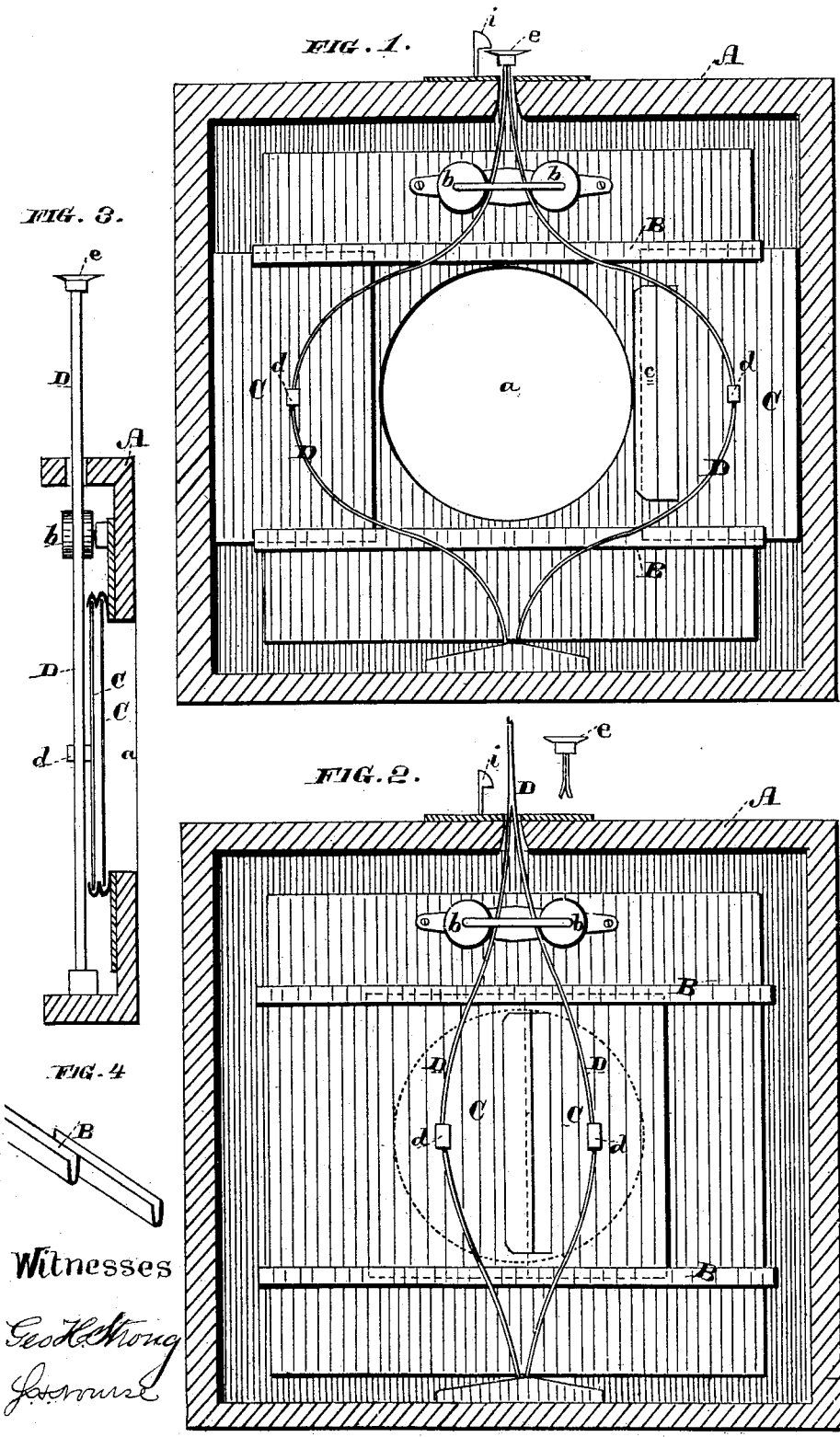

DAVID S. BOYDSTON, OF VOLCANO, CALIFORNIA.

CAMERA-SHUTTER.

SPECIFICATION forming part of Letters Patent No. 272,117, dated February 13, 1883.

Application filed December 1, 1882. (No model.)

*To all whom it may concern:*

Be it known that I, DAVID S. BOYDSTON, of Volcano, county of Amador, State of California, have invented an Improved Camera-Shutter; and I hereby declare the following to be a full, clear, and exact description thereof.

My invention relates to a novel camera-shutter which is especially adapted by the rapidity of its operation for obtaining sudden or instantaneous exposure.

My invention consists in a two-part shutter mounted in suitable guides behind the aperture, and moving apart to open the camera or together to close it under the influence of springs peculiarly arranged and secured to the shutter, in the manner I shall hereinafter particularly show.

The object of my invention is to provide an easy means of opening and closing the camera with great rapidity, whereby difficult and transient views may be taken and instantaneous photography assured.

Referring to the accompanying drawings, Figure 1 is a view showing the shutters open. Fig. 2 shows them closed. Fig. 3 is a vertical section. Fig. 4 is a detail.

Let A represent the end of a camera, in which is the opening *a*. Inside the end, above and below the opening *a*, are secured guides or tracks B, the meeting ends of which overlap in order to allow the inner edges of the two-part shutter C, traveling in said guides, to overlap, also that all light may be excluded. One of the parts of shutter C is provided with a flange, *c*, acting as a stop, against which the edge of the other part presses, and this limits the inward movement of both parts. D D are two light flat springs. The lower ends of these are brought together and secured in the bottom of the end of the camera. They thence diverge as they extend upwardly and pass loosely through a bearing, *d*, about the center of the back of each part of the shutter C. Thence they converge past two guide-rollers, *b*, and extend together through an opening in the top of the camera, and are surmounted by a finger-rest, *e*. A small catch, *i*, is placed on top of the camera, with which the finger-rest *e* engages, when the springs are pressed down and it be desired to keep the shutter open any length of time.

The operation of this device is as follows: By placing the finger on the rest *e* and pressing directly down, the springs D, already separated at the centers, further open out, carrying with them in opposite directions the parts of the shutter C, thus opening the camera. When the finger-rest is released the springs come together again, bringing together the divided shutter with great rapidity and closing the camera. This operation can be performed in an instant. Everything being in readiness, the finger is rapidy borne down upon the rest *e* and instantly removed; but during this time the shutter will have opened and closed. A single glancing blow of the finger is sufficient for instantaneous exposure. If the exposure need be perceptible, as in ordinary cases, the finger-rest may be caught under the catch *i*, and when ready may be suddenly released to close the shutter instantly.

Having thus described my invention, what I claim as new, and desire to secure by Letters Patent, is—

1. In a photographic camera, the two-part sliding shutter C, in combination with the springs D D, arranged as shown, and operating to open and close the shutter, substantially as herein described.

2. In a photographic camera, the two-part sliding shutter C, in combination with the springs D D, separated in suitable bearings or guides upon the back of each part of the shutter C, their lower ends secured together in the base of the camera and their upper ends extending together through the top of the camera, substantially as and for the purpose herein described.

3. In a photographic camera, the two-part sliding shutter C, in combination with the springs D D, arranged, as shown, and surmounted by a finger-rest, *e*, and the catch *i*, substantially as and for the purpose herein described.

4. In a photographic camera, the combination and arrangement of the two-part sliding shutter C, the springs D D, the bearings *d*, the guide-rollers *b*, the finger-rest *e*, and the catch *i*, substantially as herein described.

In witness whereof I hereunto set my hand.

D. S. BOYDSTON.

Witnesses:
   J. E. DOOLITTLE,
   J. ADAMS.